(12) United States Patent
Pacini et al.

(10) Patent No.: US 9,797,425 B2
(45) Date of Patent: Oct. 24, 2017

(54) LATCH WITH A BUILT-IN ADJUSTMENT MECHANISM

(71) Applicant: The Boeing Company, Chicago, IL (US)

(72) Inventors: Phillip E. Pacini, Bothell, WA (US); Russell J. Branham, Macomb, MI (US); Kam Wang Cheng, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/079,282

(22) Filed: Mar. 24, 2016

(65) Prior Publication Data

US 2016/0201704 A1 Jul. 14, 2016

Related U.S. Application Data

(63) Continuation of application No. 13/886,551, filed on May 3, 2013, now Pat. No. 9,297,396.

(51) Int. Cl.
*F16B 5/00* (2006.01)
*F16B 5/06* (2006.01)
(Continued)

(52) U.S. Cl.
CPC ............ *F16B 5/0607* (2013.01); *B64C 1/066* (2013.01); *F16B 5/0621* (2013.01); *F16B 5/008* (2013.01);
(Continued)

(58) Field of Classification Search
CPC ...... F16B 5/008; F16B 5/0088; F16B 5/0225; F16B 5/0233; F16B 5/0607; F16B 5/0621;
(Continued)

(56) References Cited

U.S. PATENT DOCUMENTS 144,094 A * 10/1873 Heiles ..................... E05C 17/38
24/578.17
1,144,094 A * 6/1915 Heiles ................. E21B 33/0355
137/236.1
(Continued)

FOREIGN PATENT DOCUMENTS

DE 89614 C 5/1896
DE 202009014811 U1 2/2010
(Continued)

OTHER PUBLICATIONS

International Search Report and Written Opinion dated Feb. 4, 2014, regarding Application No. PCT/US2013/057160, 10 pages.
(Continued)

*Primary Examiner* — Christopher Besler
*Assistant Examiner* — Bayan Salone
(74) *Attorney, Agent, or Firm* — Yee & Associates, P.C.

(57) ABSTRACT

A method and apparatus is provided for adjusting a latch. An apparatus comprises a latch body, a first member, and a second member associated with the latch body. A receiving area extends through at least a portion of the latch body. The first member is configured to be at least partially received within the receiving area of the latch body. The first member has a first coupling element. The second member has a second coupling element. Movement of the first member along an axis through the receiving area changes a distance between the first coupling element and the second coupling element.

19 Claims, 11 Drawing Sheets

(51) Int. Cl.
*F16B 5/02* (2006.01)
*F16L 23/08* (2006.01)
*B64C 1/06* (2006.01)

(52) U.S. Cl.
CPC ........... *F16B 5/0088* (2013.01); *F16B 5/0225* (2013.01); *F16B 5/0233* (2013.01); *F16B 5/0628* (2013.01); *F16B 5/0642* (2013.01); *Y10T 29/4998* (2015.01); *Y10T 29/49947* (2015.01); *Y10T 29/49963* (2015.01); *Y10T 403/16* (2015.01); *Y10T 403/1616* (2015.01)

(58) Field of Classification Search
CPC ....... F16B 5/0628; F16B 5/0642; F16L 23/08; B23P 2700/01; B64C 1/066; Y10T 29/49947; Y10T 29/49948; Y10T 29/49963; Y10T 403/16; Y10T 403/1616; Y10T 403/29; Y10T 403/291; Y10T 403/293; Y10T 403/295
USPC ............ 29/525, 525.01, 525.02; 403/11, 13, 403/43–46
See application file for complete search history.

(56) References Cited

U.S. PATENT DOCUMENTS

| | | | | |
|---|---|---|---|---|
| 2,286,739 A * | 6/1942 | Krause | ................... | E05B 83/24 292/341.19 |
| 2,538,757 A * | 1/1951 | Bratthauer | ................ | F16B 7/06 403/27 |
| 2,540,468 A * | 2/1951 | Anderson | ............. | E04B 1/6141 411/171 |
| 3,638,285 A * | 2/1972 | Sanchez Giraldez | ... | F16B 12/26 24/108 |
| 4,045,927 A * | 9/1977 | Diaz | ..................... | E04B 1/6162 403/292 |
| 4,116,573 A * | 9/1978 | Fuchs | .................. | F16B 5/0607 403/187 |
| 4,989,386 A * | 2/1991 | Collis | ....................... | E04B 1/10 52/285.3 |
| 4,997,218 A * | 3/1991 | Culling | ................. | E05B 63/125 292/302 |
| 5,094,485 A * | 3/1992 | Lycett | ....................... | B60P 7/13 292/143 |
| 5,280,973 A * | 1/1994 | Culling | ............... | E05B 17/0025 292/342 |
| 6,641,325 B2 * | 11/2003 | Schwarz | ............. | B60R 13/0206 403/3 |
| 7,048,071 B1 * | 5/2006 | Huenink | .............. | A01B 59/004 172/439 |
| 7,293,813 B2 * | 11/2007 | Squyres | .................... | B60P 1/00 105/372 |
| 8,348,209 B2 * | 1/2013 | Horst | ...................... | B64C 1/066 244/131 |
| 8,435,040 B2 * | 5/2013 | Costabel | ............. | B60R 13/0206 439/34 |
| 8,992,114 B2 * | 3/2015 | Ajanovic | ........... | F16B 12/2063 403/231 |
| 9,162,746 B2 * | 10/2015 | Pacini | .................... | B64C 1/066 |
| 9,297,396 B2 * | 3/2016 | Pacini | ................... | F16B 5/0621 |
| 2006/0127166 A1 * | 6/2006 | Huenink | .............. | A01B 59/004 403/43 |
| 2009/0261202 A1 * | 10/2009 | Horst | ..................... | B64C 1/066 244/131 |
| 2011/0318091 A1 * | 12/2011 | Costabel | ............. | B60R 13/0206 403/33 |
| 2014/0093312 A1 * | 4/2014 | Pacini | .................... | B64C 1/066 403/327 |
| 2014/0325824 A1 * | 11/2014 | Pacini | .................. | F16B 5/0607 29/525.01 |

FOREIGN PATENT DOCUMENTS

DE 202011104559 U1 11/2012
WO WO2010100057 A2 9/2010

OTHER PUBLICATIONS

International Search Report and Written Opinion dated Aug. 21, 2014, regarding Application No. PCT/US2014/024895, 11 pages.
Office Action, dated Jul. 17, 2014, regarding U.S. Appl. No. 13/630,683, 19 pages.
Final Office Action, dated Sep. 11, 2014, regarding U.S. Appl. No. 13/630,683, 12 pages.
Office Action, dated Jan. 5, 2015, regarding U.S. Appl. No. 13/630,683, 16 pages.
Notice of Allowance, dated Jun. 10, 2015, regarding U.S. Appl. No. 13/630,683, 16 pages.
Office Action, dated May 4, 2015, regarding U.S. Appl. No. 13/866,551, 19 pages.
Notice of Allowance, dated Nov. 18, 2015, regarding U.S. Appl. No. 13/886,551, 8 pages.

* cited by examiner

LATCH WITH A BUILT-IN ADJUSTMENT MECHANISM

CROSS-REFERENCE TO RELATED APPLICATION

This application is a continuation of and claims the benefit of priority to U.S. patent application Ser. No. 13/886,551, filed May 3, 2013, now U.S. Pat. No. 9,297,396, the entire contents of which are incorporated herein by reference.

BACKGROUND INFORMATION

1. Field

The present disclosure relates generally to a latch and, in particular, to a latch for joining panels without using any additional tools. Still more particularly, the present disclosure relates to a latch that allows two panels to be joined and the width of the gap formed between the two panels to be adjusted.

2. Background

Typically, the sidewalls of an aircraft interior are formed by installing panels that are joined together using mechanical fasteners. These panels may be referred to as, for example, "wall panels" or "sidewall panels." With some currently available techniques for joining panels, a bracket having multiple slots is used to join two panels together. Each of these slots has an elongate shape such as, for example, an oval shape. A nut plate is located within each of these slots and is allowed to move freely within the corresponding slot of the bracket. Each of the nut plates is configured to receive the threaded end of a screw.

These screws are used to fasten the panels to the bracket. In particular, each panel may have an attachment feature, such as, for example, without limitation, a loop, configured to receive the threaded end of a screw. When the bracket and the nut plates located in the slots of the bracket are positioned relative to the panels, screws are driven through the loops and into the nut plates to fasten the panels to the bracket. In this manner, the two panels are joined together by the bracket.

However, joining panels using these types of brackets, nut plates, and screws may take more time and/or effort than desired. Additionally, tools may be needed to drive the screws into the nut plates. For example, screwdrivers, screw guns, and/or other types of tools may be needed.

Further, with these types of currently available techniques, the panels may be joined outside of selected tolerances. In particular, the width of the gap formed between the panels after the panels are joined together may be greater than desired. Consequently, the installation of these panels may need to be reworked multiple times to achieve an installation of panels that are within selected tolerances. This reworking may take more time and/or effort than desired. Further, the reworking may be more expensive than desired. Therefore, it would be desirable to have a method and apparatus that take into account at least some of the issues discussed above, as well as other possible issues.

SUMMARY

In one illustrative embodiment, an apparatus comprises a latch body, a first member, and a second member associated with the latch body. A receiving area extends through at least a portion of the latch body. The first member is configured to be at least partially received within the receiving area of the latch body. The first member has a first coupling element. The second member has a second coupling element. Movement of the first member along an axis through the receiving area changes a distance between the first coupling element and the second coupling element.

In another illustrative embodiment, a method for adjusting a latch is provided. A first member having a first coupling element is inserted at least partially through a receiving area that extends through at least a portion of a latch body of the latch. The first member moves along an axis through the receiving area such that a distance between the first coupling element and a second coupling element of a second member associated with the latch body changes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that a latch that is capable of joining together wall panels without requiring any additional tools may reduce the time and/or effort needed to join and install these wall panels. Further, the illustrative embodiments recognize and take into account that it may be desirable to have a latch that allows the width of the gap formed between joined wall panels to be adjusted without requiring that the wall panels be disengaged and rejoined one or more times.

Thus, the illustrative embodiments provide a method and apparatus for joining panels using a latch that has a built-in adjustment mechanism. Further, the illustrative embodiments provide a latch that does not require any additional tools to lock fasteners received in the latch in fixed positions.

Figure 1:
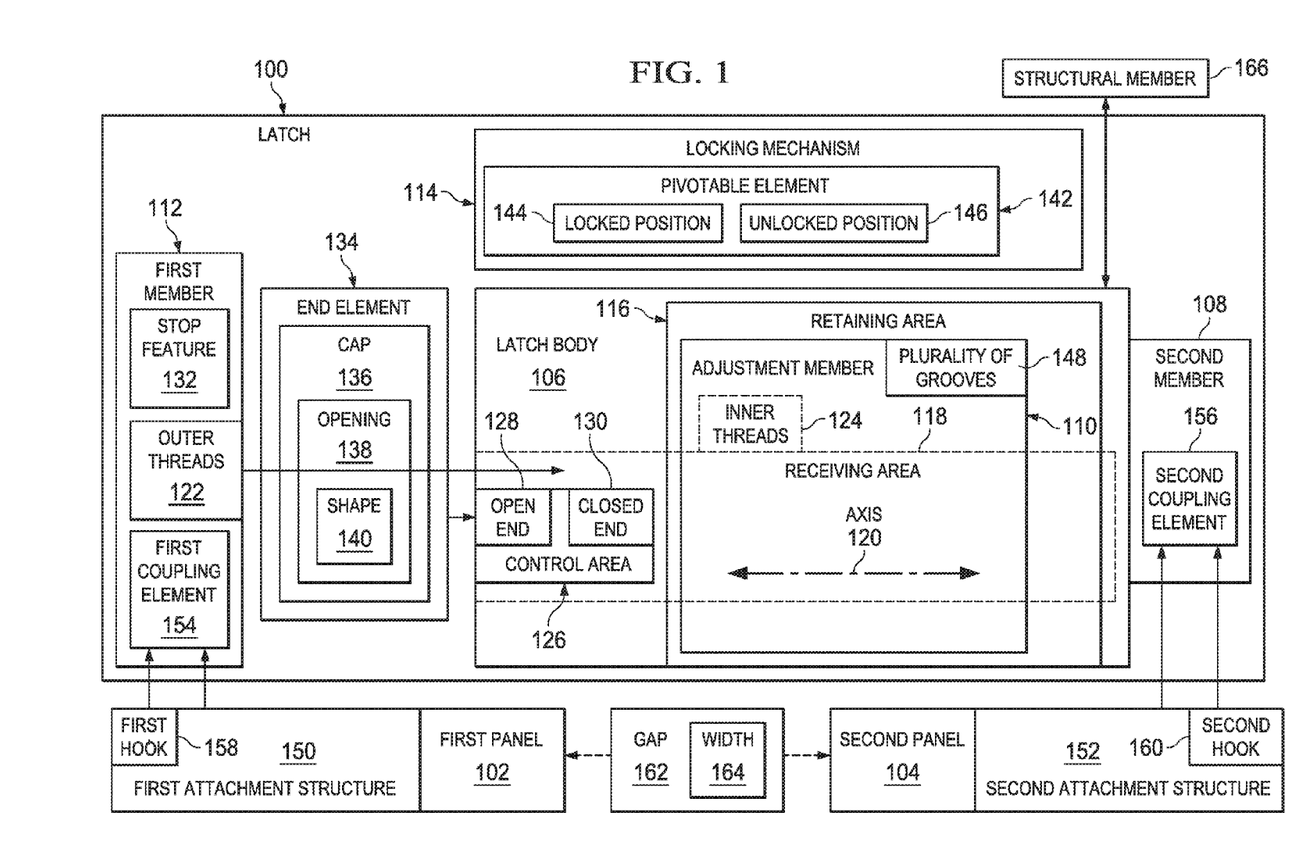
FIG. 1 is an illustration of a latch in the form of a block diagram in accordance with an illustrative embodiment.

With reference now to FIG. 1, an illustration of a latch in the form of a block diagram is depicted in accordance with an illustrative embodiment. In FIG. 1, latch 100 may be used to join first panel 102 and second panel 104. First panel 102 and second panel 104 may be, for example, without limitation, sidewall panels for the interior of an aircraft.

In this illustrative example, latch 100 includes latch body 106, first member 112, second member 108, adjustment member 110, and locking mechanism 114. As depicted, second member 108 may be associated with latch body 106. Further, second member 108 may or may not be moveable relative to latch body 106, depending on the implementation.

When one component is "associated" with another component, the association is a physical association in the depicted examples. For example, a first component, such as second member 108 may be considered to be associated with a second component, such as latch body 106, by being secured to the second component, bonded to the second component, mounted to the second component, welded to the second component, fastened to the second component, and/or connected to the second component in some other suitable manner.

The first component also may be connected to the second component using a third component. In some cases, the first component may be considered to be associated with the second component by being formed as part of and/or an extension of the second component. In other words, the first component may be an integral part of the second component. In some cases, the second component may be considered an integral part of the first component.

In this illustrative example, receiving area 118 may extend through at least a portion of latch body 106. In one illustrative example, receiving area 118 may be a hole within latch body 106 having one open end and one closed end. In another example, receiving area 118 may be partially formed by a channel that extends through latch body 106. This channel may be open at both ends.

At least a portion of receiving area 118 may be formed by adjustment member 110. In one illustrative example, adjustment member 110 may be positioned relative to latch body 106. In particular, adjustment member 110 may be held within retaining area 116 formed by latch body 106. Retaining area 116 may be an open space or cavity formed by latch body 106 having a size and/or shape configured to receive adjustment member 110. Adjustment member 110 may take a number of different forms. In one illustrative example, adjustment member 110 may be a separate component from latch body 106. For example, adjustment member 110 may take the form of a cam.

Of course, in other illustrative examples, adjustment member 110 may be formed by a portion of latch body 106. In other words, adjustment member 110 may be part of latch body 106. For example, adjustment member 110 may be the portion of latch body 106 that defines the hole through latch body 106 that forms receiving area 118.

When adjustment member 110 is positioned within retaining area 116, receiving area 118 may be formed. Receiving area 118 may extend through latch body 106 and adjustment member 110. In particular, latch body 106 may have one or more openings or holes that form a portion of receiving area 118. Further, adjustment member 110 may have a hole that forms a portion of receiving area 118.

When adjustment member 110 is separate from latch body 106 and when the hole in adjustment member 110 is open at both ends, receiving area 118 may be referred to as a channel that extends through latch body 106 and adjustment member 110. Although a channel is described as having two open ends in these illustrative examples, a channel may have one open end and one closed end, depending on the implementation.

Receiving area 118 is configured to at least partially receive first member 112. For example, first member 112 may be at least partially inserted within receiving area 118 such that first member 112 is retained by receiving area 118.

Axis 120 may extend through receiving area 118. In one illustrative example, axis 120 may be a center longitudinal axis through receiving area 118. In this illustrative example, first member 112 may be moved in a direction along axis 120 through receiving area 118. In particular, relative rotation between adjustment member 110 and first member 112 may cause first member 112 to move along axis 120. Relative rotation between adjustment member 110 and first member 112 may be rotation of one relative to the other. In this manner, relative rotation between adjustment member 110 and first member 112 may include rotation of adjustment member 110 and/or rotation of first member 112.

In one illustrative example, adjustment member 110 may be rotated about axis 120 to cause first member 112 to move along axis 120. For example, at least a portion of first member 112 may have outer threads 122. More specifically, outer threads 122 may be located on the outer surface of a portion of first member 112. Further, adjustment member 110 may have inner threads 124. Inner threads 124 may define the hole through adjustment member 110 that forms a portion of receiving area 118. Outer threads 122 of first member 112 may be configured to engage inner threads 124 of adjustment member 110 in a manner that causes first member 112 to move in a direction along axis 120 when adjustment member 110 is rotated about axis 120.

Further, first member 112 may have first coupling element 154 and second member 108 may have second coupling element 156. Movement of first member 112 along axis 120 may change a distance between first coupling element 154 and second coupling element 156. In one illustrative example, first coupling element 154 may take the form of a first elongated portion of first member 112 and second coupling element 156 may take the form of a second elongated portion of second member 108. Movement of first member 112 in one direction along axis 120 may lengthen the distance between first coupling element 154 and second coupling element 156, while movement of first member 112 in the other direction along axis 120 may shorten the distance between first coupling element 154 and second coupling element 156.

As depicted, control area 126 may be present in association with receiving area 118. In one illustrative example, control area 126 may be considered part of receiving area 118. However, in some illustrative examples, control area 126 may be considered an additional hole, opening, or channel that runs substantially parallel to receiving area 118 and opens to receiving area 118. In this illustrative example, control area 126 has open end 128 and closed end 130.

Closed end 130 may be formed by some structural portion of latch body 106. Open end 128 may be configured to receive stop feature 132 associated with first member 112.

Stop feature 132 may be associated with outer threads 122 of first member 112 in one illustrative example. Stop feature 132 may take the form of, for example, without limitation, a protrusion at some point along outer threads 122. First member 112 may be inserted into receiving area 118 in such a manner that stop feature 132 enters control area 126.

In this illustrative example, end element 134 may be associated with latch body 106. End element 134 may take the form of, for example, without limitation, cap 136. Cap 136 may be attached to latch body 106 at the entrance into receiving area 118. Cap 136 may have opening 138 that leads into receiving area 118. First member 112 may be inserted through opening 138 into receiving area 118.

As depicted, opening 138 may have shape 140 selected to receive first member 112 and stop feature 132. Shape 140 may be selected such that only one position for cap 136 relative to axis 120 may allow both first member 112 and stop feature 132 to pass through opening 138 and into receiving area 118. In one illustrative example, shape 140 may be a shape that substantially matches the cross-sectional shape of receiving area 118 and control area 126 for the cross-section taken perpendicular to axis 120.

In this illustrative example, cap 136 may be rotated about axis 120 until shape 140 aligns with receiving area 118 and control area 126. When proper alignment is not achieved, opening 138 may not open to open end 128 of control area 126. However, when proper alignment is achieved, opening 138 may open to open end 128 of control area 126.

When cap 136 is positioned such that shape 140 aligns with receiving area 118 and control area 126, first member 112 may be inserted through opening 138 into receiving area 118 and stop feature 132 may pass through opening 138 into control area 126. After stop feature 132 has fully entered control area 126, cap 136 may then be rotated about axis 120 to close open end 128 of control area 126.

In this manner, the movement of stop feature 132 may be limited by the first boundary formed by cap 136 at open end 128 and the second boundary formed by closed end 130 of control area 126. In particular, adjustment member 110 may be rotated about axis 120 to move first member 112 along axis 120. However, the distance by which first member 112 can be moved along axis 120 may be limited by the length of control area 126.

Once first member 112 has been moved to a certain position along axis 120, adjustment member 110 may be locked in place using locking mechanism 114. Locking mechanism 114 is configured to prevent relative rotation between adjustment member 110 and first member 112. In this manner, movement of first member 112 along axis 120 may be prevented.

In this illustrative example, locking mechanism 114 includes pivotable element 142. Pivotable element 142 may be configured to pivot between locked position 144 and unlocked position 146.

When pivotable element 142 is moved to unlocked position 146, adjustment member 110 may be allowed to rotate about axis 120. However, when pivotable element 142 is moved to locked position 144, adjustment member 110 may be prevented from rotating about axis 120. In this illustrative example, adjustment member 110 may have plurality of grooves 148 along the outer surface of adjustment member 110. When pivotable element 142 is moved into locked position 144, a portion of pivotable element 142 may enter,
or interface with, one of plurality of grooves 148. This interfacing may prevent adjustment member 110 from rotating.

As depicted, latch 100 may be attached to first panel 102 using first attachment structure 150 and to second panel 104 using second attachment structure 152. First attachment structure 150 may be associated with first panel 102, while second attachment structure 152 may be associated with second panel 104.

For example, first attachment structure 150 may engage first coupling element 154 of first member 112 and second attachment structure 152 may engage second coupling element 156 of second member 108. In one illustrative example, first attachment structure 150 may have first hook 158 that engages first coupling element 154 of first member 112. In this example, second attachment structure 152 may have second hook 160 that engages second coupling element 156 of second member 108.

In this manner, latch 100 may be attached to both first panel 102 and second panel 104 to join first panel 102 to second panel 104. However, gap 162 may be present between first panel 102 and second panel 104. Adjustment member 110 may be used to adjust width 164 of gap 162 formed between first panel 102 and second panel 104. Adjustment member 110 may form a "built-in" adjustment mechanism for latch 100.

In particular, by rotating adjustment member 110 about axis 120, first member 112 may be moved along axis 120. Moving first member 112 along axis 120 may move first panel 102 attached to latch 100 by first member 112. Moving first panel 102 may, in turn, change width 164 of gap 162.

In this illustrative example, latch 100 may be attached to structural member 166 through latch body 106. In this manner, latch 100 may be used to attach first panel 102 and second panel 104 to structural member 166. First panel 102 and second panel 104 may be attached to structural member 166 using latch 100 for the purpose of forming a sidewall for the interior of an aircraft.

The illustration of latch 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In other illustrative example, second member 108 may be optional. Instead, a second first member may be associated with latch body 106 in the place of second member 108 and configured for attachment to second panel 104. This second first member may be moved in a direction along axis 120 using a second adjustment member similar to adjustment member 110. In this manner, both first panel 102 attached to latch 100 through first member 112 and second panel 104 attached to latch 100 through this second first member may be moved to adjust width 164 of gap 162.

Figure 2:
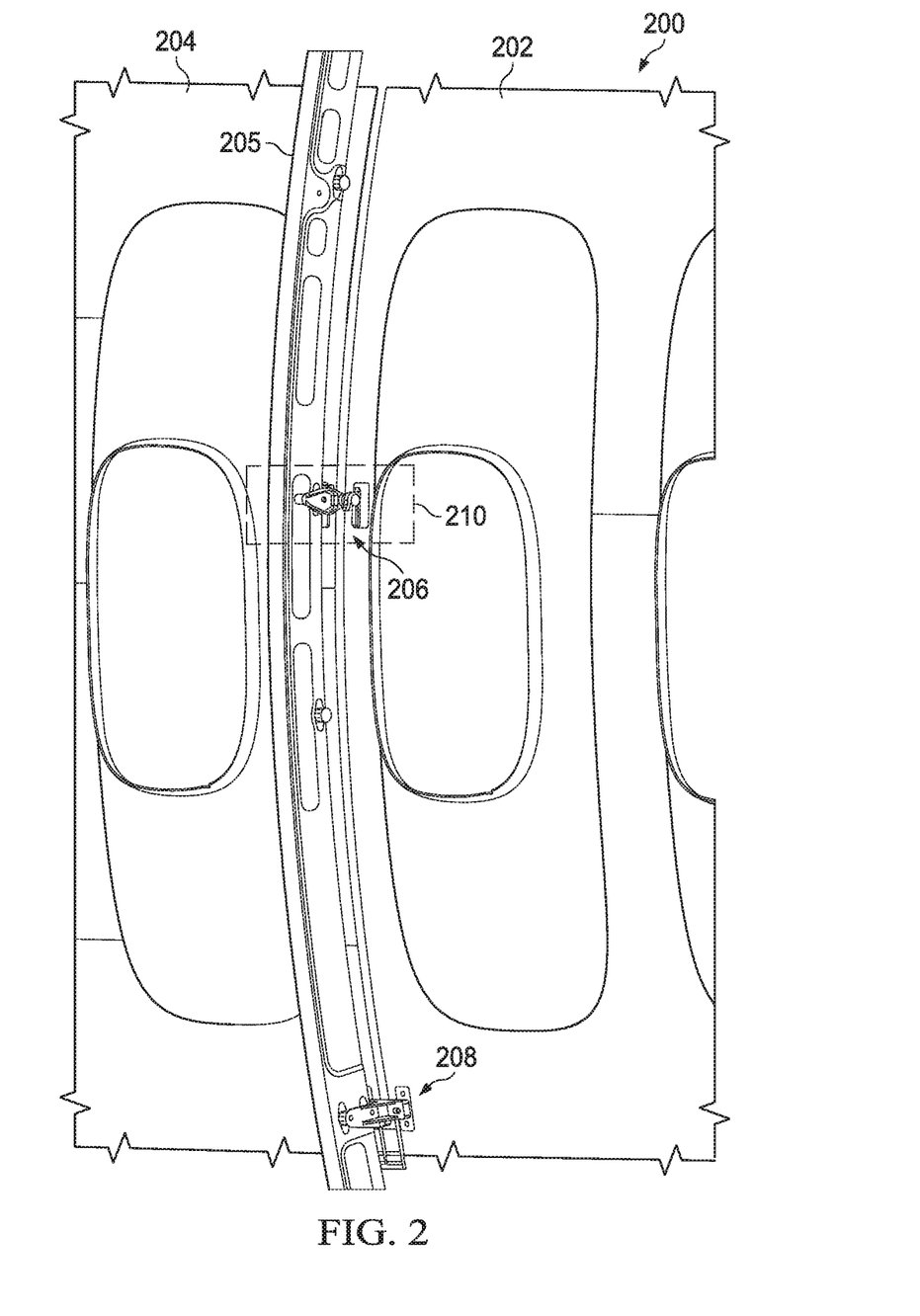
FIG. 2 is an illustration of a portion of a sidewall for an interior of an aircraft in accordance with an illustrative embodiment.

Turning now to FIG. 2, an illustration of a portion of a sidewall for an interior of an aircraft is depicted in accordance with an illustrative embodiment. As depicted in FIG. 2, a portion of sidewall 200 for an interior of an aircraft is depicted. This portion of sidewall 200 is formed by first panel 202 and second panel 204. First panel 202 and second panel 204 are examples of implementations for first panel 102 and second panel 104, respectively, in FIG. 1.

As depicted, first panel 202 and second panel 204 are joined using latch 206 and latch 208. Further, latch 206 and latch 208 attach to structural member 205. In this manner, first panel 202 and second panel 204 may be attached to structural member 205 using latch 206 and latch 208. Structural member 205 may be an example of one implementation for structural member 166 in FIG. 1.

Further, latch 206 may be an example of one implementation for latch 100 in FIG. 1. Latch 208 may be a different type of latch. Latch 206 is described in greater detail in FIGS. 3-8 below. In particular, portion 210 of sidewall 200 is shown in an enlarged view in FIG. 3.

Figure 3:
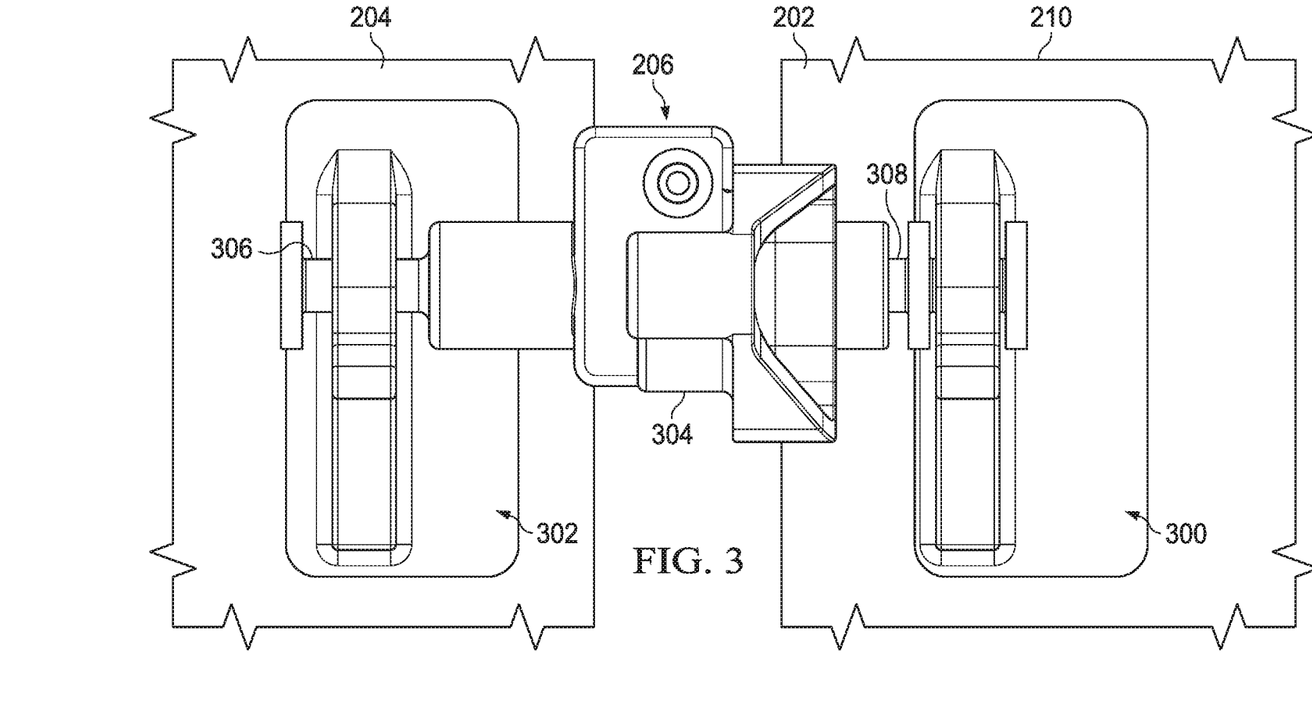
FIG. 3 is an illustration of an enlarged view of a portion of a sidewall with a latch in accordance with an illustrative embodiment.

With reference now to FIG. 3, an illustration of an enlarged view of portion 210 of sidewall 200 with latch 206 from FIG. 2 is depicted in accordance with an illustrative embodiment. In FIG. 3, an enlarged view of portion 210 of sidewall 200 from FIG. 2 is shown without structural member 205 from FIG. 2 such that latch 206 may be more clearly seen.

In this illustrative example, latch 206 is attached to first panel 202 using first attachment structure 300 and attached to second panel 204 using second attachment structure 302. First attachment structure 300 and second attachment structure 302 may be examples of implementations for first attachment structure 150 and second attachment structure 152, respectively, in FIG. 1.

As depicted, latch 206 includes latch body 304, second member 306, and first member 308. Latch body 304, second member 306, and first member 308 may be examples of implementations for latch body 106, second member 108, and first member 112, respectively, in FIG. 1. In this illustrative example, first attachment structure 300 engages first member 308, while second attachment structure 302 engages second member 306.

Figure 4:
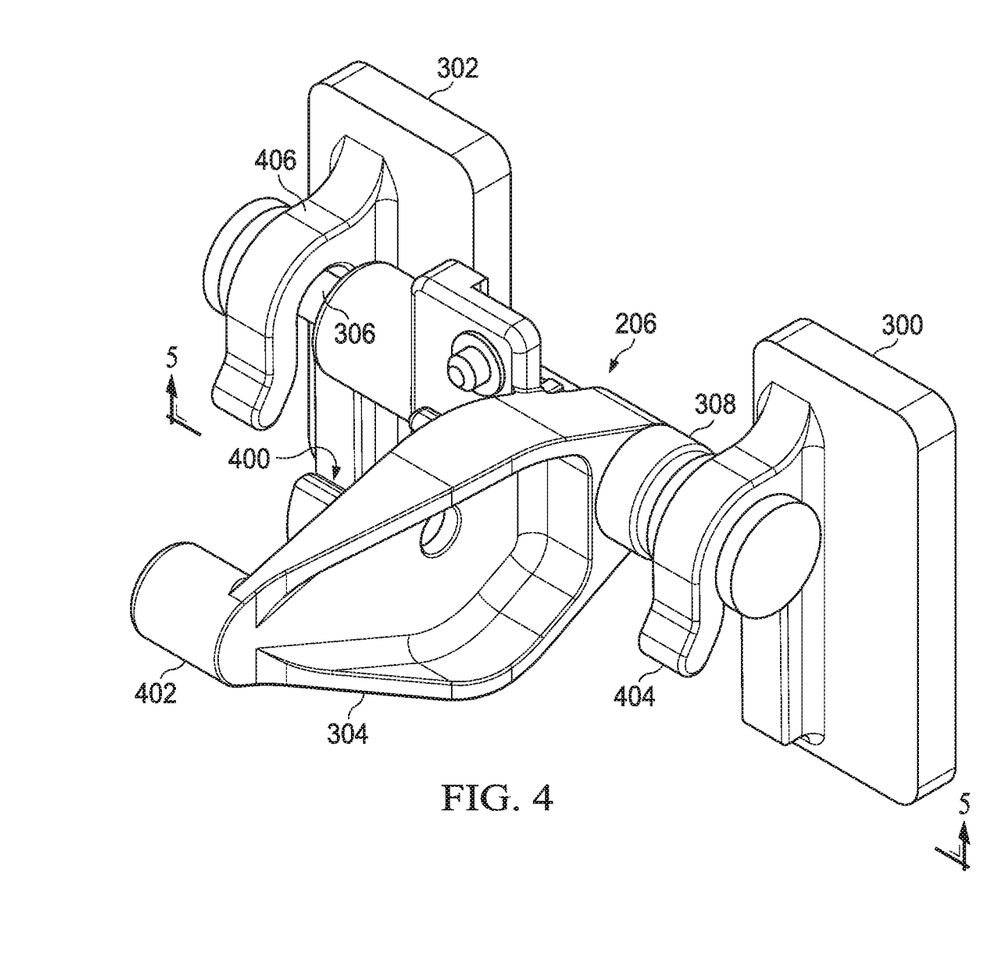
FIG. 4 is an illustration of an isometric view of a latch in accordance with an illustrative embodiment.

Turning now to FIG. 4, an illustration of an isometric view of latch 206 from FIGS. 2-3 is depicted in accordance with an illustrative embodiment. As depicted, latch body 304 includes attachment feature 400 and attachment feature 402. Attachment feature 400 and/or attachment feature 402 may be used to attach latch body 304 to structural member 205 in FIG. 2.

Further, first attachment structure 300 includes first hook 404. Second attachment structure 302 includes second hook 406. First hook 404 engages first member 308, while second hook 406 engages second member 306.

Figure 5:
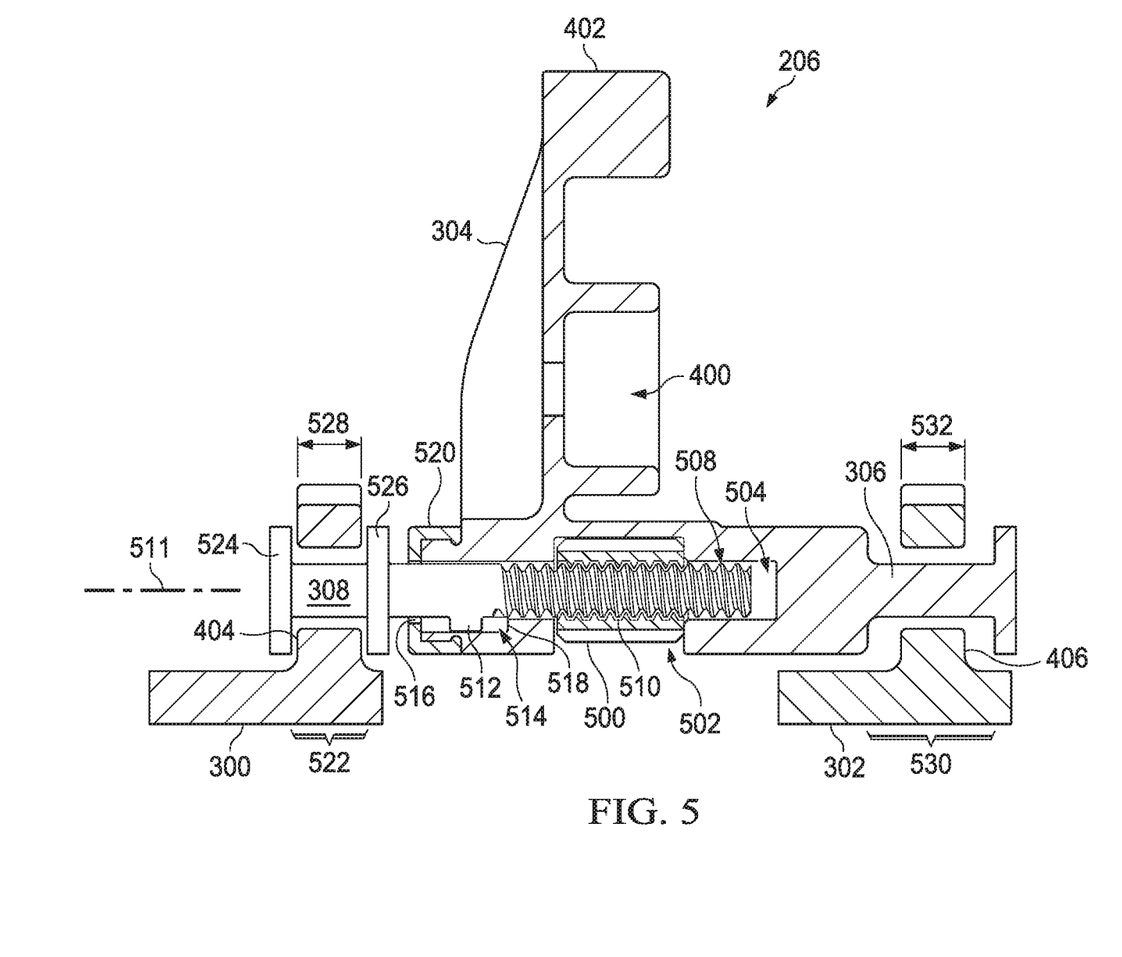
FIG. 5 is an illustration of a top cross-sectional view of a latch in accordance with an illustrative embodiment.

With reference now to FIG. 5, an illustration of a top cross-sectional view of latch 206 from FIG. 4 is depicted in accordance with an illustrative embodiment. In this illustrative example, a top cross-sectional view of latch 206 is depicted, taken with respect to lines 5-5 in FIG. 4.

As depicted, latch 206 includes adjustment member 500. Adjustment member 500 is a cam in this illustrative example. Adjustment member 500 is an example of one implementation for adjustment member 110 in FIG. 1. Adjustment member 500 is held within retaining area 502 formed by latch body 304. When adjustment member 500 is held within retaining area 502, channel 504 is formed. Channel 504 may be an example of one implementation for receiving area 118 in FIG. 1. Channel 504 extends through latch body 304 and adjustment member 500. In particular, a portion of channel 504 is formed by one or more holes, openings, or channels in latch body 304, while another portion of channel 504 is formed by an opening, hole, or channel that extends through adjustment member 500.

In this illustrative example, adjustment member 500 has inner threads 508 along the opening through adjustment member 500 that forms a portion of channel 504. Further, first member 308 has outer threads 510. When first member 308 is inserted through channel 504, inner threads 508 engage outer threads 510. With inner threads 508 and outer threads 510 engaged, rotation of adjustment member 500 about axis 511 causes movement of first member 308 in a direction along axis 511.

As depicted, first member 308 has stop feature 512. Stop feature 512 may enter control area 514 when first member 308 is inserted into channel 504. In this illustrative example, control area 514 has open end 516 and closed end 518. Cap 520 may be used to close open end 516. Cap 520 may be an example of one implementation for cap 136 in FIG. 1. When open end 516 is closed by cap 520, the movement of first member 308 is limited to the movement of stop feature 512 within control area 514.

In this illustrative example, first hook 404 is depicted engaged with first coupling element 522 of first member 308. First coupling element 522 of first member 308 is bounded by element 524 and element 526 of first member 308. Element 524 and element 526 constrain first coupling element 522 such that first coupling element 522 has a width substantially equal to, or just slightly wider than, width 528 of first hook 404. In this manner, first hook 404 may be constrained by element 524 and element 526. When engaged with first coupling element 522, first hook 404 may be constrained such that first hook 404 may be unable to move in a direction along axis 511 independently of first member 308.

Second hook 406 is depicted engaged with second coupling element 530 of second member 306. Second coupling element 530 of second member 306 may be wider than width 532 of second hook 406. In this manner, second hook 406 may be allowed to move in a direction along axis 511 along second coupling element 530 of second member 306 independently of second member 306. In this manner, when second panel 204 from FIG. 2 is also connected to the first member of another latch, similar to latch 206, the extra width of second coupling element 530 may allow movement of second panel 204.

Figure 6:
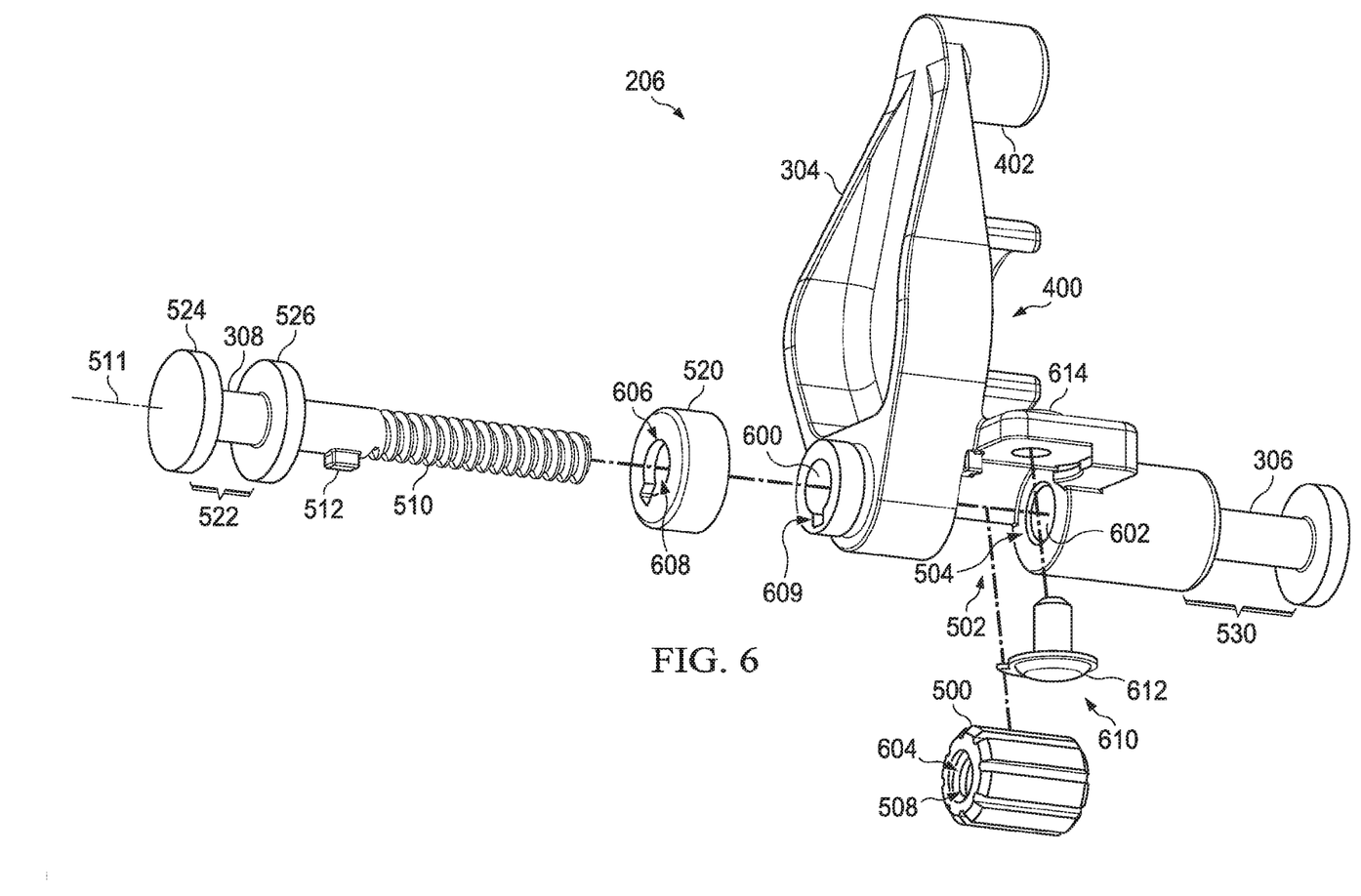
FIG. 6 is an illustration of an exploded isometric view of a latch in accordance with an illustrative embodiment.

With reference now to FIG. 6, an illustration of an exploded isometric view of latch 206 is depicted in accordance with an illustrative embodiment. In this illustrative example, the individual components of latch 206 may be more clearly seen. As depicted, latch body 304 may have opening 600 and opening 602 that form a portion of channel 504 from FIG. 5. Further, adjustment member 500 may have opening 604 that forms a portion of channel 504 from FIG. 5.

In this illustrative example, cap 520 has opening 606 having shape 608. Shape 608 may be selected such that first member 308 and stop feature 512 may both pass through opening 606. Similarly, opening 600 may have shape 609 such that first member 308 and stop feature 512 may pass through opening 600. Stop feature 512 may pass through opening 600 and enter control area 514 from FIG. 5.

As depicted, latch 206 may also include locking mechanism 610. Locking mechanism 610 may be an example of one implementation for locking mechanism 114 in FIG. 1. Locking mechanism 610 includes pivotable element 612 and fastener 614. Fastener 614 may be used to attach pivotable element 612 to latch body 304. The functions of locking mechanism 610 are described in greater detail in FIGS. 7-8 below.

Figure 7:
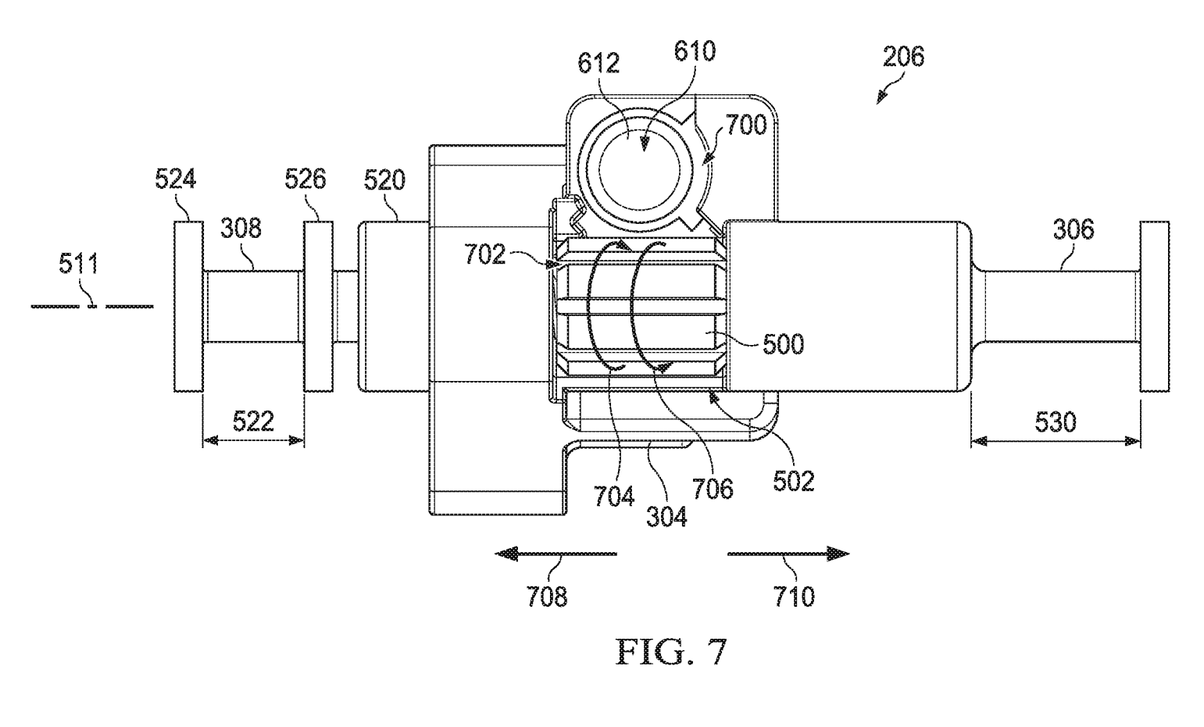
FIG. 7 is an illustration of a latch having a locking mechanism in an unlocked position in accordance with an illustrative embodiment.

Turning now to FIG. 7, an illustration of latch 206 having locking mechanism 610 in an unlocked position is depicted in accordance with an illustrative embodiment. In this illustrative example, locking mechanism 610 is unlocked. In particular, pivotable element 612 is in unlocked position 700. When pivotable element 612 is in unlocked position 700, pivotable element 612 does not engage or interface with any of plurality of grooves 702 in adjustment member 500. Consequently, adjustment member 500 may be allowed to rotate about axis 511.

For example, adjustment member 500 may be rotated in the direction of arrow 704 or the direction of arrow 706 to move first member 308 along axis 511. In one illustrative example, rotating adjustment member 500 in the direction of arrow 704 may cause movement of first member 308 in the direction of arrow 708. In this example, rotating adjustment member 500 in the direction of arrow 706 may cause movement of first member 308 in the direction of arrow 710.

Pivotable element 612 may be rotated in a direction along arrow 708 to move pivotable element 612 between unlocked position 700 and a locked position (not shown). This locked position for pivotable element 612 is depicted in FIG. 8 below.

Figure 8:
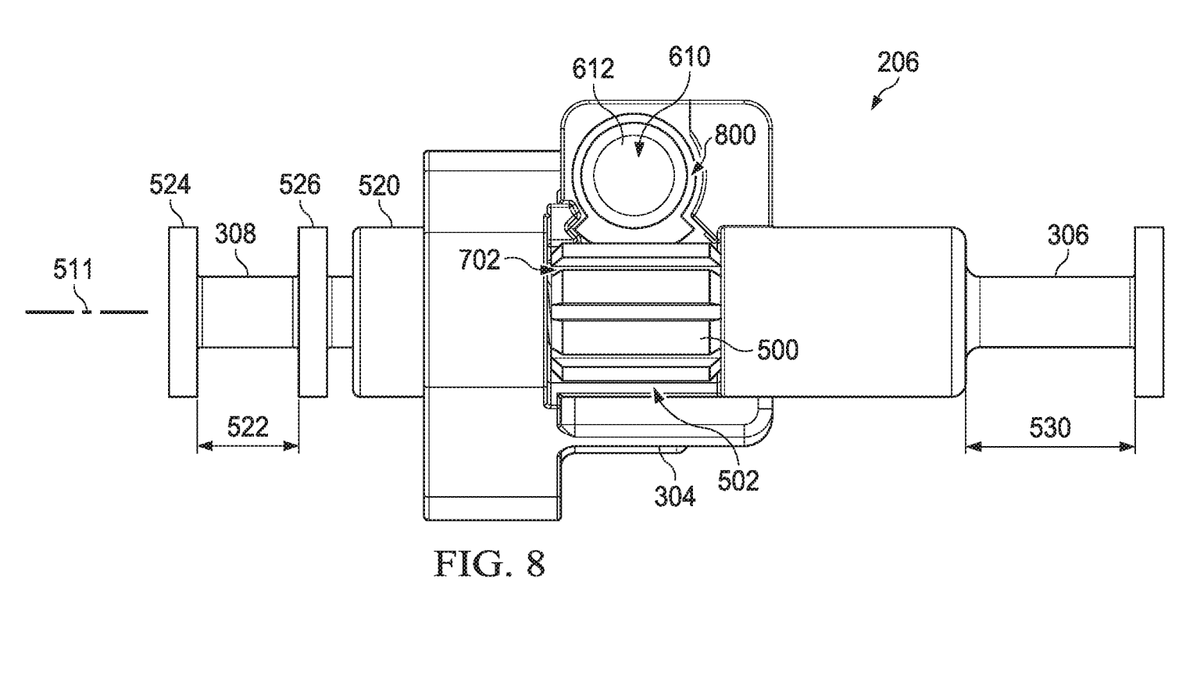
FIG. 8 is an illustration of a latch having a locking mechanism in a locked position in accordance with an illustrative embodiment.

With reference now to FIG. 8, an illustration of latch 206 having locking mechanism 610 in a locked position is depicted in accordance with an illustrative embodiment. In this illustrative example, locking mechanism 610 is locked. In particular, pivotable element 612 has been rotated and moved into locked position 800. In locked position 800, pivotable element 612 engages, or interfaces with, a groove in plurality of grooves 702 in adjustment member 500. This type of engagement prevents rotation of adjustment member 500 about axis 511.

The illustrations of sidewall 200 in FIG. 2 and latch 206 in FIGS. 2-8 are not meant to imply physical or architectural limitations to the manner in which an illustrative embodiment may be implemented. Other components in addition to or in place of the ones illustrated may be used. Some components may be optional.

The different components shown in FIGS. 2-8 may be illustrative examples of how components shown in block form in FIG. 1 can be implemented as physical structures. Additionally, some of the components in FIGS. 2-8 may be combined with components in FIG. 1, used with components in FIG. 1, or a combination of the two.

Figure 9:
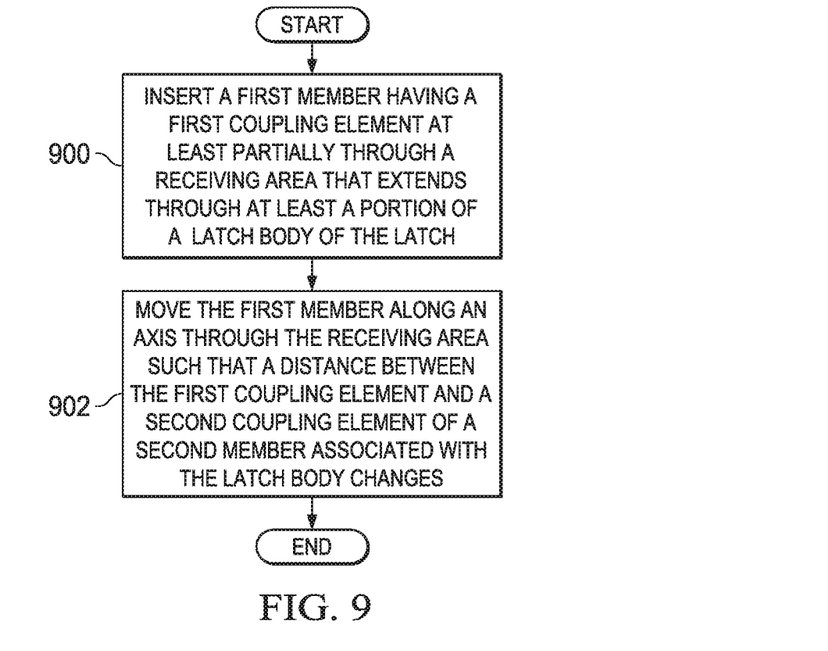
FIG. 9 is an illustration of a process for adjusting a latch in the form of a flowchart in accordance with an illustrative embodiment.

With reference now to FIG. 9, an illustration of a process for adjusting a latch is depicted in the form of a flowchart in accordance with an illustrative embodiment. The process illustrated in FIG. 9 may be implemented using latch 100 from FIG. 1 and/or latch 206 from FIGS. 2-8.

The process begins by inserting a first member having a first coupling element at least partially through a receiving area that extends through at least a portion of a latch body of the latch (operation 900). Thereafter, the first member is moved along an axis through the receiving area such that a distance between the first coupling element and a second coupling element of a second member associated with the latch body changes (operation 902), with the process terminating thereafter.

In this manner, the latch may be adjusted. The first coupling element and the second coupling element may be used for joining two panels together through the latch. Changing the distance between these two coupling elements may change a width of the gap between the two panels.

Figure 10:
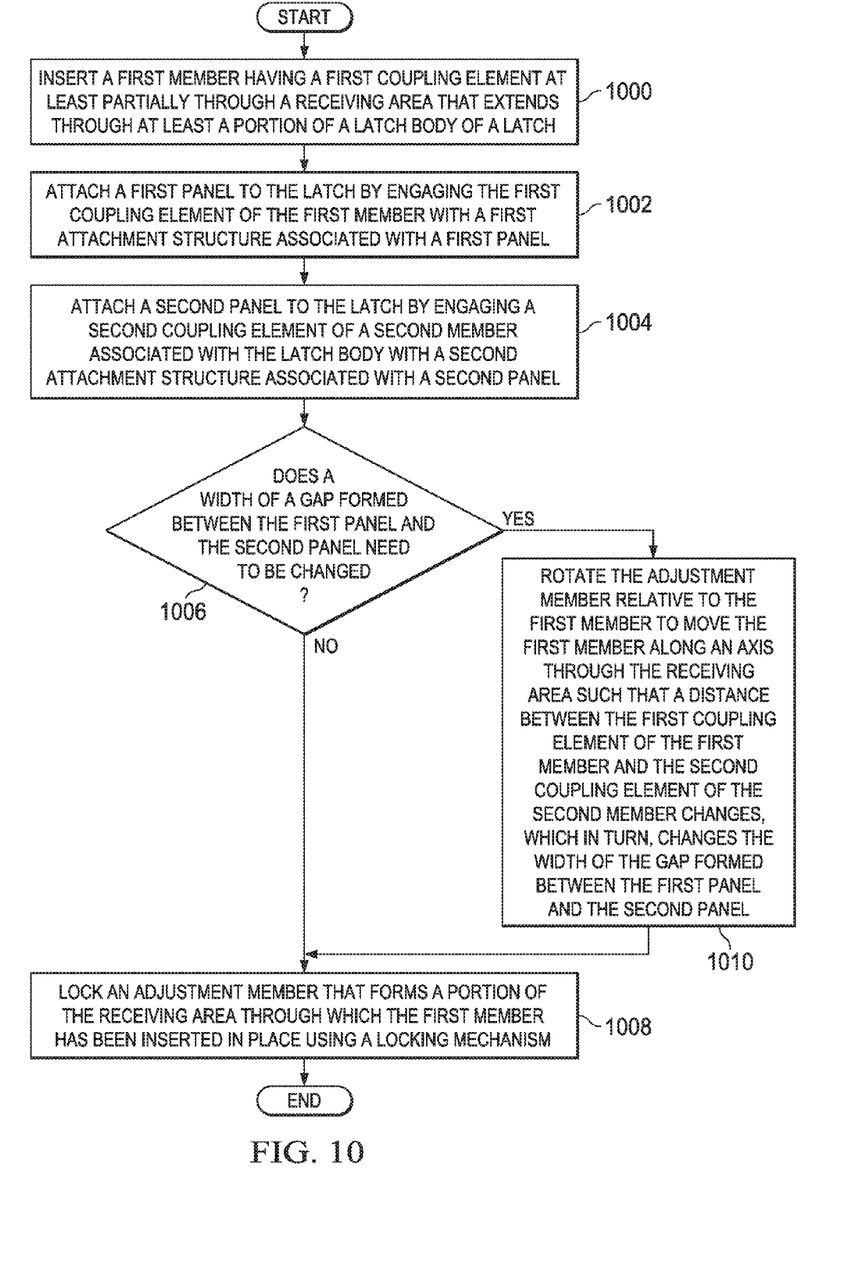
FIG. 10 is an illustration of a process for attaching panels to each other using a latch in the form of a flowchart in accordance with an illustrative embodiment.

With reference now to FIG. 10, an illustration of a process for attaching panels to each other using a latch is depicted in the form of a flowchart in accordance with an illustrative embodiment. The process illustrated in FIG. 10 may be implemented using latch 100 from FIG. 1 and/or latch 206 from FIGS. 2-8.

The process begins by inserting a first member having a first coupling element at least partially through a receiving area that extends through at least a portion of a latch body of a latch (operation 1000). Next, a first panel is attached to the latch by engaging the first coupling element of the first member with a first attachment structure associated with a first panel (operation 1002). Further, a second panel is attached to the latch by engaging a second coupling element of a second member associated with the latch body with a second attachment structure associated with the second panel (operation 1004). In this manner, the first panel and the second panel may be joined together using the latch.

Thereafter, a determination may be made as to whether a width of a gap formed between the first panel and the second panel needs to be changed (operation 1006). If the width of the gap does not need to be changed, an adjustment member that forms a portion of the receiving area through which the first member has been inserted is locked in place using a locking mechanism (operation 1008), with the process terminating thereafter.

If the width of the gap does need to be changed, the adjustment member is rotated relative to the first member to move the first member along an axis through the receiving area such that a distance between the first coupling element of the first member and the second coupling element of the second member changes, which in turn, changes the width of the gap formed between the first panel and the second panel (operation 1010). The process then proceeds to operation 1008 as described above.

Figure 11:
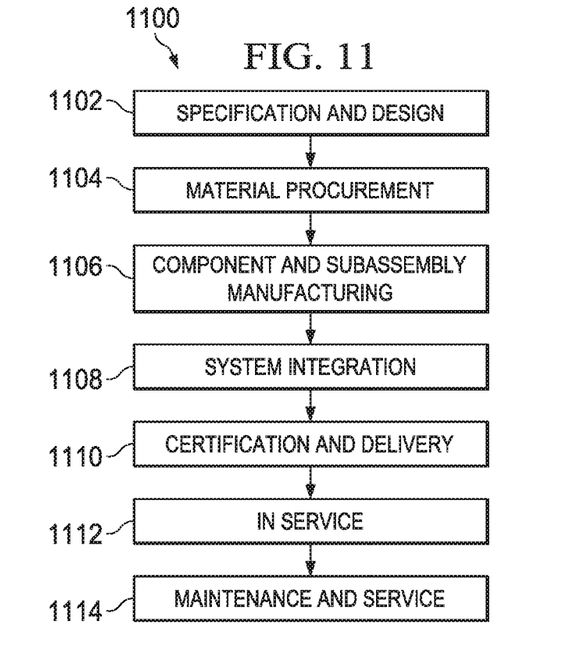
FIG. 11 is an illustration of an aircraft manufacturing and service method in the form of a flowchart in accordance with an illustrative embodiment.
Figure 12:
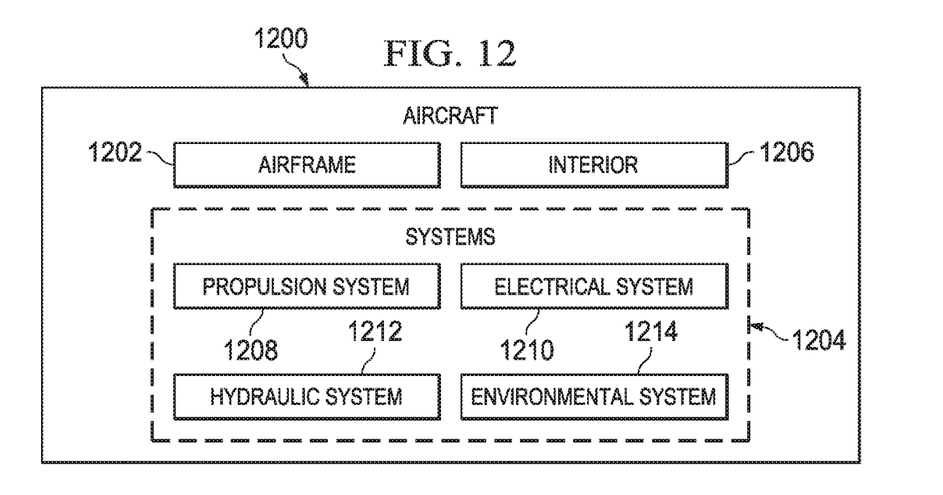
FIG. 12 is an illustration of an aircraft in the form of a block diagram in accordance with an illustrative embodiment.

Illustrative embodiments of the disclosure may be described in the context of aircraft manufacturing and service method 1100 as shown in FIG. 11 and aircraft 1200 as shown in FIG. 12. Turning first to FIG. 11, an illustration of an aircraft manufacturing and service method in the form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in the form of a block diagram is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. For example, latches implemented in a manner similar to latch 100 from FIG. 1 and/or latch 206 from FIGS. 2-8 may be used to install the sidewall for interior 1206 of aircraft 1200. These latches may be used during component and subassembly manufacturing 1106, system integration 1108, and/or maintenance and service 1114. Further, the different components that make up these latches may be manufactured and/or assembled during at least one of material procurement 1104 and component and subassembly manufacturing 1106.

Using a latch similar to latch 100 from FIG. 1 and/or latch 206 from FIGS. 2-8 may reduce the overall time needed for installing the sidewall for the interior of aircraft 1200. Further, using these types of latches may be easier than using loose fasteners, screw guns, and/or other types of tools for installation, adjustment, and/or removal of panels for the sidewall. Still further, using these types of latches that allow the width of the gaps between the panels to be adjusted may increase the efficiency with which the sidewall may be installed.

In one illustrative example, components or subassemblies produced in component and subassembly manufacturing 1106 in FIG. 11 may be fabricated or manufactured in a manner similar to components or subassemblies produced while aircraft 1200 is in service 1112 in FIG. 11. As yet another example, one or more apparatus embodiments, method embodiments, or a combination thereof may be utilized during production stages, such as component and subassembly manufacturing 1106 and system integration 1108 in FIG. 11. One or more apparatus embodiments, method embodiments, or a combination thereof may be utilized while aircraft 1200 is in service 1112 and/or during maintenance and service 1114 in FIG. 11. The use of a number of the different illustrative embodiments may substantially expedite the assembly of and/or reduce the cost of aircraft 1200.

In this manner, the illustrative embodiments provide a method and apparatus adjusting a latch. The latch may comprise a latch body, a first member, and second member associated with the latch body. A receiving area extends through at least a portion of the latch body. The first member is configured to be at least partially received within the receiving area. The first member has a first coupling element. The second member has a second coupling element. Movement of the first member along an axis through the receiving changes a distance between the first coupling element and the second coupling element. In this manner, the latch may be adjusted by changing the distance between the first coupling element and the second coupling element. Making this adjustment may change the width of the gap formed between any two objects joined together using the latch.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a latch body, wherein a receiving area extends through at least a portion of the latch body and comprising a slot forming a control area having a closed end and an open end;
   a first member configured to be at least partially received within the receiving area of the latch body, wherein the first member has a first coupling element and a stop feature protruding radially from the first member and configured to ride in the slot forming the control area within the latch body when the first member is at least partially received within the receiving area of the latch body;
   an end element associated with the latch body and comprising an opening including a notch, wherein the stop feature is configured to pass through the notch in the end element and the open end of the slot forming the control area when the end element is positioned with respect to the latch body such that the notch in the end element is aligned with the slot forming the control area and such that the open end of the slot forming the control area is closed to prevent movement of the stop feature through the open end of the slot forming the control area when the end element is positioned with respect to the latch body such the notch in the end element is not aligned with the open end of the slot forming the control area;
   a second member associated with the latch body, wherein the second member has a second coupling element and wherein movement of the first member along an axis through the receiving area changes a distance between the first coupling element and the second coupling element;
   a first attachment structure configured to engage the first coupling element of the first member; and
   a second attachment structure configured to engage the second coupling element of the second member.

2. The apparatus of claim 1, wherein the first attachment structure is associated with a first panel and wherein the second attachment structure is associated with a second panel.

3. The apparatus of claim 2, further comprising:
   the first panel having the first attachment structure associated therewith; and
   the second panel having the second attachment structure associated therewith;
   wherein the first panel and the second panel are configured for use in forming a sidewall for an interior of an aircraft.

4. The apparatus of claim 3, wherein moving the first member along the axis through the receiving area such that the distance between the first coupling element and the second coupling element changes a width of a gap between the first panel and the second panel.

5. The apparatus of claim 2, wherein the latch body further comprises:
   a structural attachment feature configured for attachment to a structural member of an aircraft, such that the first panel and the second panel are associated with the structural member.

6. The apparatus of claim 5, wherein the structural member is selected from the group consisting of a frame of the aircraft, a stringer of the aircraft, a rib of the aircraft, and a spar of the aircraft.

7. The apparatus of claim 1, wherein the first attachment structure comprises a first hook configured to engage the first coupling element of the first member and the second attachment structure comprises a second hook configured to engage the second coupling element of the second member.

8. The apparatus of claim 7, wherein the first coupling element comprises:
   a first elongated portion of the first member configured to receive the first hook; and
   a first plurality of retention collars configured to axially constrain the first elongated portion in the first hook;
   wherein when engaged, the first hook is unable to move along the axis independently from the first member.

9. The apparatus of claim 8, wherein the second coupling element comprises:
   a second elongated portion of the second member configured to receive the second hook; and
   a second plurality of retention collars configured to axially constrain the second elongated portion in the second hook;
   wherein when engaged, the second hook is unable to move along the axis independently from the second member.

10. The apparatus of claim 1, wherein the end element is used to close the open end of the control area with the stop feature of the first member located within the control area such that a distance by which the first member can be moved along the axis is determined by a length of the control area.

11. The apparatus of claim 1 further comprising:
   an adjustment member configured to form a portion of the receiving area and receive at least a portion of the first member and wherein relative rotation between the adjustment member and the first member causes the first member to move along the axis.

12. The apparatus of claim 11, wherein the adjustment member is a separate component positioned relative to the latch body and configured to be held within a retaining area formed by the latch body such that a channel through the latch body opens into a hole within the adjustment member to form the receiving area.

13. The apparatus of claim 11, wherein the first member has outer threads configured to engage inner threads along a hole in the adjustment member.

14. The apparatus of claim 11 further comprising:
   a locking mechanism configured to prevent the relative rotation between the adjustment member and the first member.

15. The apparatus of claim 14, wherein the locking mechanism comprises:
   a pivotable element, wherein rotation of the pivotable element into a locked position locks the adjustment member in place to prevent the relative rotation between the adjustment member and the first member and wherein rotation of the pivotable element into an unlocked position unlocks the adjustment member to allow the relative rotation between the adjustment member and the first member.

16. The apparatus of claim 15, wherein the adjustment member comprises:
   a plurality of grooves, wherein the pivotable element is configured to enter a groove in the plurality of grooves when the pivotable element is in the locked position.

17. A method for adjusting a latch, the method comprising:
   engaging a first coupling element of a first member to a first attachment structure wherein the first member comprises a stop feature protruding radially from the first member;
   engaging a second coupling element of a second member associated with a latch body of the latch to a second attachment structure, wherein the latch body comprises a slot forming a control area having a closed end and an open end;
   positioning an end element associated with the latch body and comprising an opening including a notch in a first position with respect to the latch body wherein the notch in the end element is aligned with the open end of the slot forming the control area;
   inserting the first member having the first coupling element at least partially through a receiving area that extends through at least a portion of the latch body by passing the stop feature protruding from the first member through the notch in the end element and into the slot forming the control area when the end element is positioned in the first position with respect to the latch body;
   positioning the end element in a second position with respect to the latch body wherein the notch in the end element is not aligned with the open end of the slot forming the control area such that the end element prevents movement of the stop feature through the open end of the slot forming the control area; and
   moving the first member along an axis through the receiving area such that a distance between the first coupling element and the second coupling element changes.

18. The method of claim 17, wherein moving the first member along the axis through the receiving area comprises:
   rotating the first member relative to an adjustment member that forms a portion of the receiving area to move the first member along the axis through the receiving area such that the distance between the first coupling element and the second coupling element of the second member associated with the latch body changes.

19. The method of claim 17, wherein engaging the first coupling element of the first member to the first attachment structure further comprises:
   engaging a first elongated portion of the first member to a first hook of the first attachment structure;
   axially constraining the first hook between a first plurality of retention collars of the first elongated portion, wherein the first hook is unable to move along the axis independently from the first member;
   engaging a second elongated portion of the second member to a second hook of the second attachment structure; and
   axially constraining the second hook between a second plurality of retention collars of the second elongated portion, wherein the second hook is unable to move along the axis independently from the second member.

* * * * *